(12) United States Patent
Enting et al.

(10) Patent No.: US 8,613,688 B2
(45) Date of Patent: Dec. 24, 2013

(54) GEARBOX COMPRISING A STATIONARY GEAR COMPONENT FORMED ON THE BASIS OF VARIABLE FLANK PROFILES OF GEAR TEETH

(75) Inventors: Andreas Enting, Fröndenberg (DE); Khashayar Nazifi, Dortmund (DE)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/563,386

(22) Filed: Jul. 31, 2012

(65) Prior Publication Data

US 2013/0035198 A1 Feb. 7, 2013

(30) Foreign Application Priority Data

Aug. 3, 2011 (EP) .................................. 11006392

(51) Int. Cl.
*F16H 57/08* (2006.01)

(52) U.S. Cl.
USPC ........................................................ 475/344

(58) Field of Classification Search
USPC .............................. 475/344; 74/462
See application file for complete search history.

(56) References Cited

U.S. PATENT DOCUMENTS

| 2,956,451 | A | | 10/1960 | Bowman |
| 3,043,158 | A | * | 7/1962 | Herr, Jr. ........................ 74/462 |
| 3,206,997 | A | * | 9/1965 | Hardy .............................. 74/462 |
| 8,171,637 | B2 | * | 5/2012 | Michaud et al. ............. 29/893.3 |
| 2008/0108470 | A1 | * | 5/2008 | Michaud et al. ............. 475/159 |

FOREIGN PATENT DOCUMENTS

| DE | 102005027050 A1 | 12/2006 |
| EP | 0180846 A1 | 5/1986 |
| EP | 1600667 A1 | 11/2005 |
| WO | 2011047448 A1 | 4/2011 |

OTHER PUBLICATIONS

European Patent Office, European Search Report in corresponding EP Application No. 11006392.2 mailed Sep. 28, 2011, 5 pages.

* cited by examiner

*Primary Examiner* — Dirk Wright
(74) *Attorney, Agent, or Firm* — Wood, Herron & Evans, LLP

(57) ABSTRACT

In a gearbox, a stationary gear component such as a ring gear of a planetary gear comprises a tooth trace correction that varies along the tooth trace so as to provide for superior load distribution in the gearbox. In some illustrative embodiments, the gearbox is a component of a wind power plant wherein the circumferentially varying tooth trace correction of the stationary ring gear results in superior durability and performance.

10 Claims, 10 Drawing Sheets

GEARBOX COMPRISING A STATIONARY GEAR COMPONENT FORMED ON THE BASIS OF VARIABLE FLANK PROFILES OF GEAR TEETH

TECHNICAL FIELD

Generally, the present invention relates to gear systems, such as planetary gears, in which superior load distribution may be achieved by applying a tooth trace correction on teeth of at least some components of the gearbox. In particular, the present invention relates to gearboxes that are configured to transmit high mechanical powers, such as gearboxes of wind power plants.

BACKGROUND

In many technical applications drive trains have to be used, which have to transfer a large mechanical power, wherein a conversion of input torque and rotation speed rate into appropriate output torque and rate is required. To this end, a wide variety of gear systems has been developed so as to comply with the various requirements in many technical fields. Generally, in a gear system at least two gears are engaged with each other so as to transfer mechanical forces in compliance with the application under consideration. The actual mechanical coupling between the various gear components takes place via the surface areas of the corresponding meshing components, such as the teeth of rotary or linear gear components. Consequently, corresponding compressive forces may act on the individual teeth flank, wherein the forces are transferred via the contact surfaces of the individual teeth meshing with each other. Therefore, the actually occurring mechanical pressure and thus the mechanical stress acting on the individual teeth significantly depends on the area or point or line of interaction, which in turn is affected by the overall profile of the teeth flanks. Generally, in high performance gearboxes the mechanical efficiency, the noise generation, the duration and the like are important aspects that have to be addressed in order to comply with the requirements of the various applications. For example, the engagement of the individual teeth of two gears can be adjusted so as to obtain an improvement in one or more of the above-mentioned aspects, for instance in view of noise reduction and the like, by appropriately adapting the flank profile of the teeth. To this end, frequently a so-called tooth trace correction is applied during the fabrication of one or more gears of a gearbox in order to appropriately adapt the tooth flanks to the expected load condition during operation of the gear system. For example, the leading flank of the teeth may be provided with a different profile compared to the trailing flank of the teeth, when substantially a predefined direction of rotation of the gears is encountered in the application under consideration. The process of tooth trace correction is thus a well-established concept for improving the load conditions for various components of the gearbox, for instance by applying appropriate additional manufacturing steps upon fabricating the individual gears of the gear system and/or by controlling the manufacturing process for the teeth, for instance the grinding process, in order to establish the teeth so as to have the desired target flank profile.

In many applications a substantially balanced load distribution in complex gearboxes is an essential aspect when the gearbox is designed for transferring high mechanical powers. For example, over the last decades wind energy has proven to be one important component for providing alternative energy due to the superior availability of wind energy and the moderately high cost-effectiveness of modern wind power plants. Presently, most of the highly efficient wind turbines are designed on the basis of wind rotors supported by a substantially horizontal shaft that in turn is mechanically coupled to a gearbox in order to convert the moderately low rotation speed of the wind rotor into a desired high rotation speed of an electrical generator. The conversion of the low input speed and high input torque into a high output speed and moderately low output torque is frequently accomplished on the basis of a planetary gear system, which thus has to transfer a mechanical power of several hundred kW to several MW, depending on the size of the wind power plant. Upon installing a wind power plant with horizontal rotor axis these gearboxes have to be mounted in the nacelle on a tower with a height of several 10 meters to 100 meters or more so that, for economical and technical reasons, generally a high power-to-weight ratio is desirable for the gearbox. For this reason, the weight of the gearbox is typically reduced as much as possible in order to obtain a desired power-to-weight ratio, thereby necessitating the components of the gearbox to be dimensioned closely to the material fatigue limits. On the other hand, the gearboxes have to be operated in remote locations, possibly in sophisticated environmental conditions, for instance offshore, so that regular maintenance intervals may represent an important cost factor, which in turn significantly influences the overall profitability of the wind power plant. Consequently, manufacturers of planetary gear systems for wind turbines have to meet very different requirements, for instance increasing the power-to-weight ratio, which requires reducing the amounts of required materials for the various gears, and providing superior durability at a reduced number of maintenance events over the lifetime of the wind turbine. The latter aspect may, however, require superior materials or an increased amount of material for enhancing the mechanical strength of the various components and/or the application of superior manufacturing techniques, such as sophisticated tooth trace corrections in order to reduce any load variations that may occur in the individual components of the planetary gear system.

Frequently, a gearbox structure is used in wind power plants in which a stationary ring gear of the planetary system engages with the planetary wheel whose carrier in turn is mechanically coupled to the shaft that supports the wind rotor. On the other hand, the sun gear is typically mechanically connected to an output shaft of the planetary gear system, which in turn may be coupled to a further gear system or to an electric machine. Consequently, the significant diameter of the wind rotor in combination with typically varying wind conditions, in particular in sophisticated environments, may result in a pronounced variation of the load conditions acting on the planetary gear system. That is, the torque transferred from the wind rotor via the shaft into the planetary stage of the gearbox may finally result in corresponding varying load conditions for the stationary ring gear and the sun gear. Consequently, great efforts are being made in estimating the load conditions for various operating states in order to apply sophisticated tooth trace corrections for the planetary wheels, the sun gear and the stationary ring gear. To this end, an appropriate tooth flank profile is determined for the teeth of at least one of these components in order to obtain reduced variability of the resulting load conditions. It turns out, however, that the conventional tooth trace correction concept may not efficiently address the varying load conditions, which are particularly introduced by the planetary wheel carrier connected to a mechanical load that induces strongly varying torque conditions, such as the wind rotor of a wind turbine.

In view of the situation described above, it is an object of the present invention to provide gearboxes and manufacturing techniques in order to provide for superior balance of load conditions in a gearbox.

SUMMARY

According to one aspect of the present invention, the object is solved by a gearbox that comprises a stationary gear component having a plurality of teeth formed along a tooth trace. At least some of the plurality of teeth differ in their tooth flank profiles at least at an initial phase of the operational lifetime of the gearbox. The gearbox further comprises at least one rotary gear that is mechanically coupled to a subset of the teeth of the stationary gear component. It may prove advantageous when the tooth flank profiles of at least some teeth of the stationary gear component are individually adjusted. This may be accomplished by individually forming the teeth and/or by individually machining the teeth, the tooth flanks and/or the tooth flank profiles. The leading and/or trailing tooth flank profile of each tooth can be individually adjusted, preferably such that said tooth flank profile comprises geometrical variations along the axial direction of said stationary gear component.

According to the present invention, at least some teeth of the stationary gear component are provided along the tooth trace thereof so as to provide for varying tooth geometries. A difference in flank profile of a tooth or generally a difference in tooth geometry is to be understood such that at least a first tooth is provided along the tooth trace which has a first flank profile, i.e., a leading flank and/or a trailing flank profile, that differs from the corresponding flank profile of a second tooth so that the first and second teeth are configured to be operated at different load conditions that may be encountered along the different locations along the tooth trace. Consequently, the stationary gear component may be provided so as to have an appropriately adapted tooth profile depending on the location of a respective tooth along the tooth trace, which may thus allow for a superior load distribution. The variance in the tooth profile may be achieved by determining the stress conditions of the teeth depending on their position along the tooth trace and by appropriately adapting the shape or profiles of the tooth under consideration at the various locations of interest so that the adapted shape deviations and the torque induced by locally varying stress conditions may compensate each other or may at least be reduced. That is, in particular, any deviations or deflections of the teeth induced by torque forces varying along the tooth trace, such as the perimeter of ring gear and the like, or the length of a linear gear component, may be compensated for or may be at least significantly reduced for deviations caused by the rotary gear in a highly non-symmetric manner along the tooth trace.

It may prove helpful when the tooth flank profiles are individually adjusted as a function of at least one of the following parameters:

a. a parameter representing a position of the tooth to be adjusted along the tooth trace;

b. a parameter representing a positional and/or directional and/or dimensional relation between the rotary gear and said stationary gear component, preferably a parameter representing a tilt between the axis of the rotary gear and the axis of the stationary gear component and/or a parameter representing a shaft skew and/or a parameter representing a shaft inclination as calculated in accordance with DIN 3964 of November 1980;

c. a parameter relating to the transmission of energy and/or the gear engagement between the rotary gear and the stationary gear component, preferably a parameter representing a working pressure angle between the rotary gear and the stationary gear component;

d. a parameter representing a dimension of the rotary gear and/or a dimension of the stationary gear component, preferably a parameter representing a width of the respective tooth face of the stationary gear component.

The individual adjustment of the tooth flank profiles is preferably accomplished by individually forming and/or individually machining the teeth, tooth flanks or tooth flank profiles, respectively. In this case, mechanical loads can be transferred between the rotary gear and the stationary gear component more evenly, such that local peaks of compressive stress can be reduced and the operational lifetime of the gearbox is increased.

It may prove beneficial when said tooth flank profiles are individually adjusted as a function of the following formula (I):

$$\Delta f\_(\phi)=\sin \phi * f\_\gamma * \sin \alpha\_wt + \cos \phi * f\_\gamma * \cos \alpha\_wt \quad (I)$$

wherein $\phi$=angle of the position of the tooth to be adjusted along the tooth trace, wherein the angle is preferably measured in a clockwise direction in relation to the center axis of the stationary gear component as seen from the load input side of the gearbox, wherein the position representing an angle $\phi$ of 0° is most preferably a position which is offset by 90° in clockwise direction from a load-side intersecting position of a plane spanned by the axis of the rotary gear and by the axis of the stationary gear component when intersecting, and the stationary gear component, as seen from the load input side of the gearbox;

f_$\gamma$=amount of the effective flank line angular deviation by virtue of the influence of the tilt of the axis of the rotary gear when intersecting the axis of the stationary gear component, wherein f_$\gamma$=b*tan ($\gamma$) and b corresponds to the width of the tooth along an axial direction of the stationary gear component;

$\alpha$_wt=working pressure angle of the gear engagement between the rotary gear and the stationary gear component; and $\Delta$f_($\phi$)=overall tooth flank compensation amount by virtue of the influence of the parameters $\phi$, f_$\gamma$ and $\alpha$_wt.

The overall tooth flank compensation amount $\Delta$f_($\phi$) represents the deviation from a regular flank line that may be calculated for tooth flanks and tooth flank profiles, respectively, e.g. as described in section 21.4.5 b) of the handbook "Maschinenelemente Band II—Getriebe allgemein, Zahnradgetriebe—Grundlagen, Stirnradgetriebe"; Niemann, Gustav; 2$^{nd}$ revised edition 1983, Springer-Verlag, in consideration of DIN 3960 to 3967 as valid in November 1980 and the norms referred to therein. With such tooth trace correction, the transfer of mechanical loads from the rotary gear to the stationary gear component can be significantly improved, such that local peaks of compressive stress can be reduced and the operational lifetime of the gearbox is still further increased.

It may also prove useful when a subset of teeth having different tooth flank profiles is repeated along the tooth trace. This is preferred when only certain teeth of the rotary gear engage with the teeth of the stationary gear component in a predictable manner.

In some illustrative embodiments the stationary component is a ring gear of a planetary gear system and thus a torque of specific direction may thus result in a corresponding variation of the resulting deflections of any teeth in the stationary gear ring. In this case, the tooth profile varying along the circumferential direction of the ring gear may appropriately be adapted to this variation of the resulting tooth stress conditions in order to provide for superior load distribution.

In some illustrative embodiments the at least one rotary gear is one of a plurality of planet wheels of the planetary gear and is engaged with the ring gear. Moreover, in further illustrative embodiments the at least one rotary gear is connected to a mechanical load so as to cause compressive forces that act on the teeth flank of the stationary gear component in a locally varying manner. Consequently, for many externally applied torque forces caused by the mechanical load coupled to the at least one rotary gear the resulting compressive forces, which may typically result in a certain deviation of shape of the corresponding teeth flank, may efficiently be reduced or compensated for, as is also discussed above. To this end, the difference in flank profile of the teeth of the stationary gear component is correlated to the compressive forces induced by the mechanical load in a manner that is position-dependent along the tooth trace. For example, the tilting of the shaft of a wind rotor may efficiently be taken into consideration upon applying a tooth trace correction to the stationary ring gear, thereby efficiently reducing or compensating the resulting compressive forces, which would otherwise be unevenly distributed along the circumferential direction of the ring gear. Consequently, contrary to conventional tooth trace corrections, the variation of the tooth profiles along the circumferential direction in correlation with, for instance, the resulting tilt or other well predictable torque forces caused by the wind rotor, may thus provide for a superior load distribution thereby resulting in superior mechanical efficiency and/or durability and the like.

In still further illustrative embodiments, the gearbox comprises at least one further rotary gear that is engaged with the at least one rotary gear and which is mechanically coupled to a generator of a wind power plant. In further illustrative embodiments, the gearbox is configured to transfer a mechanical power of 100 kW or higher so that in particular the gearbox may be implemented in sophisticated wind power plants of high power, wherein the superior load distribution in the gearbox may result in an increased power-to-weight ratio, since generally the size of the various components of the gearbox may be reduced. On the other hand, the power-to-weight ratio may be increased for a given size of the gearbox by enabling the transfer of an increased mechanical power due to the superior robustness and reliability of the ring gear teeth.

Generally, the inventive gearbox including the position-dependent tooth trace correction of the stationary gear component may provide for superior lifetime and performance of the drive train, which in the case of sophisticated wind turbines may allow the specifying of higher load conditions for a given family of wind turbines without having to increase the overall size of the gearbox and thus of any other periphery of the wind turbine.

In other illustrative embodiments the gearbox may be used in a drive train of a wind turbine yaw system in order to adjust the angle position of a nacelle of the wind power plant. In this case, the torque forces of the wind rotor that is properly oriented to the wind direction may result in predictable load conditions at the teeth of a "stationary" gear (i.e., yaw gear), wherein the mechanical stress may thus vary along the circumferential direction of the "stationary" gear. Also in this case, a circumferentially varying tooth trace correction is applied in some illustrative embodiments in order to provide for superior mechanical robustness and reliability of the gear system of a yaw system of the wind turbine.

According to a further aspect of the present invention, the above object is solved by a method of fabricating a stationary gear component of a gearbox that is to be engaged with at least one rotary gear of the gearbox. The method comprises adjusting a flank profile of teeth of the stationary gear component so as to differ for at least some of the teeth along a tooth trace of the stationary gear component.

Hence, by applying the above-specified method the stationary gear component of a gearbox, as specified above, may be fabricated wherein the adjustment of the varying tooth profile or tooth configuration along the tooth trace may be accomplished during the manufacturing process, i.e., during a process for forming the teeth of the gear component and/or during a specific tooth flank correction process in which the desired final flank profile is adjusted in a separate fabrication process so as to obtain individual flank profiles for at least some different teeth of the stationary gear component.

In one illustrative embodiment, the adjustment of a flank profile of teeth of the gear component comprises the determining of a force distribution along the tooth trace for a given flank profile for each of the teeth and the adapting of the flank profile of the at least some teeth in correlation to the determined force distribution. For example, according to this embodiment a certain force distribution may be "predicted" in order to estimate the load conditions during the actual operation of a gearbox, wherein the forces may be different along the tooth trace of the stationary gear component. Consequently, in correlation to the determined force distribution, which may typically result in a certain shape deflection, the target flank profile may be determined for at least some different positions along the tooth trace in order to obtain a superior distribution of the resulting load and thus shape deflection of the teeth.

It should be appreciated that the determination of the force distribution at the various positions along the tooth trace for a given tooth profile may not require the actual fabrication of teeth having the same tooth profile but may involve appropriate simulation or calculation techniques, which may predict the deflection of a corresponding basic shape of the teeth for a specified force distribution. From the corresponding results the desired final flank profile at various positions along the tooth trace may then be determined, for instance by appropriate calculations, experiments and the like, in order to obtain the desired even load distribution. For example, in some illustrative embodiments, the torque forces which act on the stationary gear component via the at least one rotary gear when coupled to a substantially horizontal shaft of a wind rotor are determined. Hence, as already discussed above, in particular a superior load distribution may be accomplished in a stationary component of a gearbox in a wind power plant. Also in this case it is to be noted that the determination of any torque forces conveyed via the at least one rotary gear component onto the stationary gear component may be accomplished by experiments, calculations, measurement results of actual implemented gearboxes and the like.

In one illustrative embodiment adjusting a flank profile of the teeth of the stationary gear component comprises establishing a relative motion between the stationary gear component and a material removal tool and performing a material removal process so as to form the at least some teeth that differ in their flank profiles. In this case, well-established mechanical manufacturing processes, such as grinding and the like, may efficiently be applied in order to form the individual teeth of the stationary component so as to have the position-dependent tooth profile. That is, a grinding tool may appropriately be "scanned" across the basic body of the stationary component in order to obtain the teeth of the gear component having the individually adjusted flank profiles. It should be appreciated that the correspondingly controlled grinding process may be applied during the actual manufacturing process, i.e., during a process for producing the teeth from a non-shaped basic material block of the stationary component, thereby implementing the desired target profile for each of the teeth. In other cases, the process of fabricating the teeth and adjusting the final individual flank profile may involve a plurality of manufacturing steps, at least one of which is performed such that a varying tooth trace correction is achieved.

In a further illustrative embodiment, adjusting a flank profile of the teeth further comprises establishing a control data set on the basis of a target profile for each of the teeth and controlling the relative motion by using the control data set. In this embodiment the process tool, such as a grinding machine, has implemented therein an appropriate control mechanism operated on the basis of the control data set in order to appropriately control the relative position between the grinding or generally material removal tool and the work piece, i.e., the stationary gear component. In this manner, the varying tooth trace correction can be implemented into existing grinding tools by establishing an appropriate control data set, which in turn may be established on the basis of a correlation between the determined force distribution and the required adapted overall configuration of the individual teeth that is appropriate for compensating or reducing the position-dependent tooth deflections caused by the determined force distribution.

In one illustrative embodiment the adjusting of the flank profile of the teeth further comprises the positioning of the stationary gear component on a support of a material removal tool, such as a grinding tool, in order to obtain different position coordinates of the stationary gear component along at least one spatial direction for at least two different locations along the tooth trace. For example, the gear component may be positioned on a work piece stage of the process tool in a defined "non-even" manner so as to superimpose the difference in position coordinates in at least one spatial direction to the relative motion between the support stage and a grinding tool of the machine under consideration. For example, a desired offset in height between various circumferential positions is introduced upon positioning the gear component on a work piece holder, which may result in a corresponding "wobbling" that is superimposed to the relative motion, which is generally selected so as to obtain a basic substantially identical tooth profile for any of the teeth of the gear component. Thus, an additional movement is obtained by the locally varying position coordinates, for instance the varying height of the gear component when attached to the work piece holder in order to provide for the desired locally varying tooth trace correction.

It should be appreciated that the introduction of a varying position coordinate, i.e., an intentionally introduced "uneven" support of the work piece may efficiently be combined with an appropriate control data set, which itself results in an individual adjustment of the flank profiles, thereby achieving superior flexibility and, if desired, an increased range of variability of the tooth trace corrections. For example, a certain limitation of superimposing an additional tooth trace correction movement for an individual adaptation of flank profiles based on an appropriate control of the grinding tool may be circumvented by using an "uneven" attachment of the gear component on the work piece holder of the grinding machine.

Consequently, load distributions of stationary gear components may efficiently be determined in advance, for instance on the basis of calculations, experiments, measurements and the like, and appropriate individual flank profiles are then determined so as to reduce or compensate any variability of tooth deflections in the stationary gear component. In this manner, in particular for high power gear systems such as the gearboxes of wind power plants, increased lifetime for a given power range and size of the gearbox are achieved, while the time interval between regular maintenance events may also be prolonged without sacrificing robustness and reliability of the gearboxes.

With reference to the accompanying drawings, further illustrative embodiments will now be described in more detail.

DETAILED DESCRIPTION

Figure 1A:
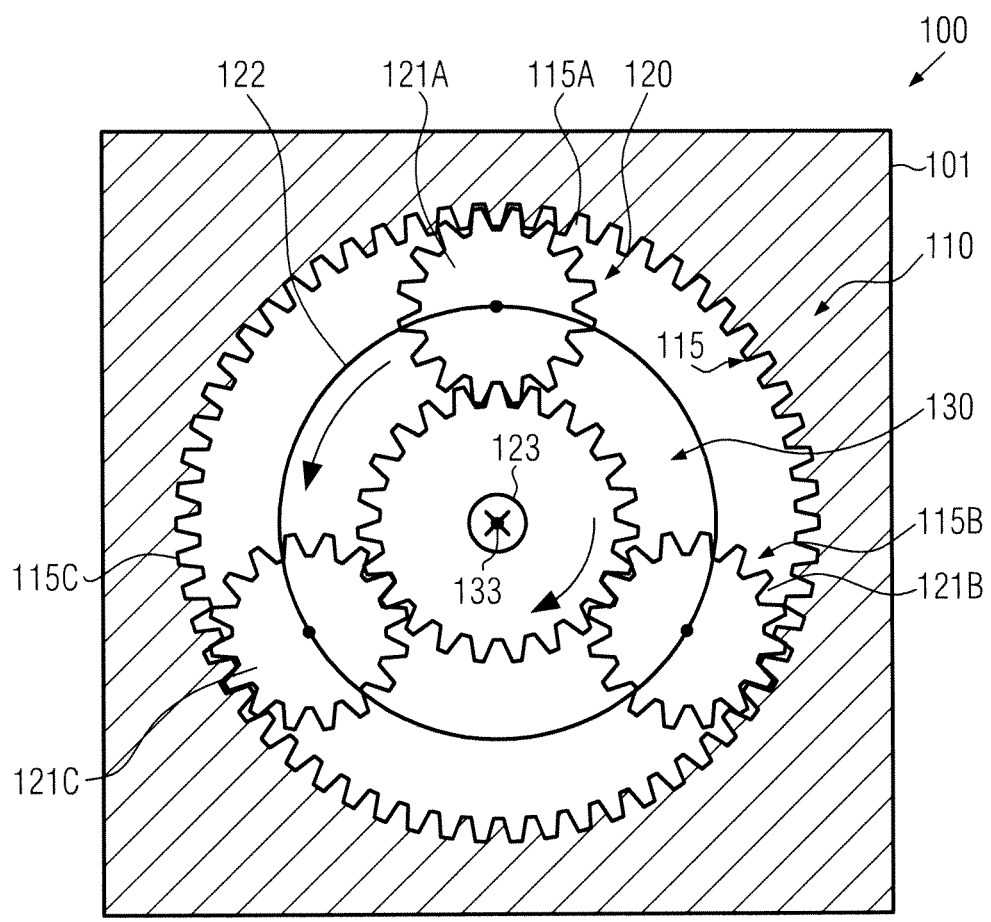
FIG. 1a schematically illustrates a sectional view of a planetary gear.

FIG. 1a schematically illustrates a cross-sectional view of a gear system 100 which may be provided in the form of a planetary system configured for transferring a mechanical power of at least 100 kW or significantly higher. The gearbox 100 comprises a stationary gear component 110, such as a ring gear, which is in engagement with a plurality of planetary wheels 121a, 121b, 121c of a planetary wheel stage 120. Typically, the planetary wheel stage 120 may comprise a wheel carrier 122, which in turn may be attached to a shaft 123 that rotatably supports a load such as a rotor and the like. Moreover, sun gear 130 may be provided so as to be in engagement with the planetary wheel stage 120 wherein a shaft 133 of the sun gear 130 may mechanically connect to an electric machine such as a generator and the like. It should be appreciated that the configuration of the gearbox 100 may be altered in any manner as is required for complying with the specific application under consideration. For example, two or more stages may be implemented in the gearbox 100 or the planetary wheel stage 120 may comprise more planetary wheels than what is shown in FIG. 1a.

As discussed above, the ring gear 110 is provided in the form of a "stationary" component of the gearbox 100, which is to be understood such that the ring gear 110 is rigidly attached to a housing 101 of the gearbox 100, which in turn may be attached to any appropriate support, as required for accommodating the mechanical loads applied to the gearbox 100. Moreover, the ring gear 110 comprises a tooth trace 115, which is to be understood as a baseline or generally a base surface on which appropriately shaped teeth (not shown in FIG. 1a) are arranged so as to mesh with corresponding teeth of the planetary wheels 121a, 121b, 121c of the planetary wheel stage 120. It should be appreciated that corresponding teeth may also extend in a direction perpendicular to the drawing plane of FIG. 1a and may have any appropriate basic configuration, for instance the corresponding teeth may be applied as helical teeth, ie. as components that may be inclined with respect to the circumferential direction of the tooth trace 115. In other cases, a substantially linear configuration of the corresponding teeth may be implemented except for a corresponding tooth trace correction along a "width" direction of the component 110, which is to be understood as the direction perpendicular to the drawing plane of FIG. 1a.

Due to the stationary nature of the ring gear 110 with respect to the planetary wheel stage 120, generally a torque force applied to the shaft 123 of the carrier 122 may generally result in compressive forces along the tooth trace 115 of the stationary ring gear 110 conveyed via the planetary wheels 121a, 121b, 121c. For a substantially spatially constant torque acting on the shaft 123, however, the resulting force distribution along the tooth trace 115 may vary depending on the position of the individual planetary wheels 121a, 121b, 121c. For example, the resulting compressive forces acting on any teeth flank that are currently engaged with the planetary wheel 121a, may be significantly greater compared to the associated forces transferred by the planetary wheels 121b, 121c for the given torque conditions so that generally the load distribution with respect to the given input torque along the tooth trace 115 of the stationary component 110 differs along the tooth trace 115. Consequently, the resulting deflection of teeth for a given equal flank profile will also conventionally result in a different shape deviation so that, for instance, in a section 115a of the tooth trace 115a premature fatigue of the teeth of the ring gear 110 may result. According to the principles disclosed herein, however, the flank profiles of the teeth vary along the tooth trace 115, preferably in correlation with the expected force distributions associated with one or more predictable load conditions. For example, an appropriate tooth trace correction may be applied so as to take into consideration the increased compressive forces within the section 115a compared to sections 115b, 115c in which, for deposition of the planetary wheel stage 120 as shown in FIG. 1a, a significantly reduced amount of compressive forces will occur for the same torque condition caused by an external force acting on the shaft 123. Consequently, by appropriately adapting the overall tooth trace correction, i.e., establishing different flank profiles within the section 115a on the one hand and the sections 115b, 115c on the other hand, for instance due to the difference in shape deviation, an appropriate load distribution may be obtained. It should be appreciated that a difference in the flank profile of the individual teeth (not shown) may also be established within each individual section 115a, depending on the desired positional "resolution" of the varying tooth trace correction. For example, in some illustrative embodiments, the flank profile of each tooth is individually adjusted on the basis of its position along the tooth trace 115 and for one or more desired externally induced load conditions.

Figure 1B:
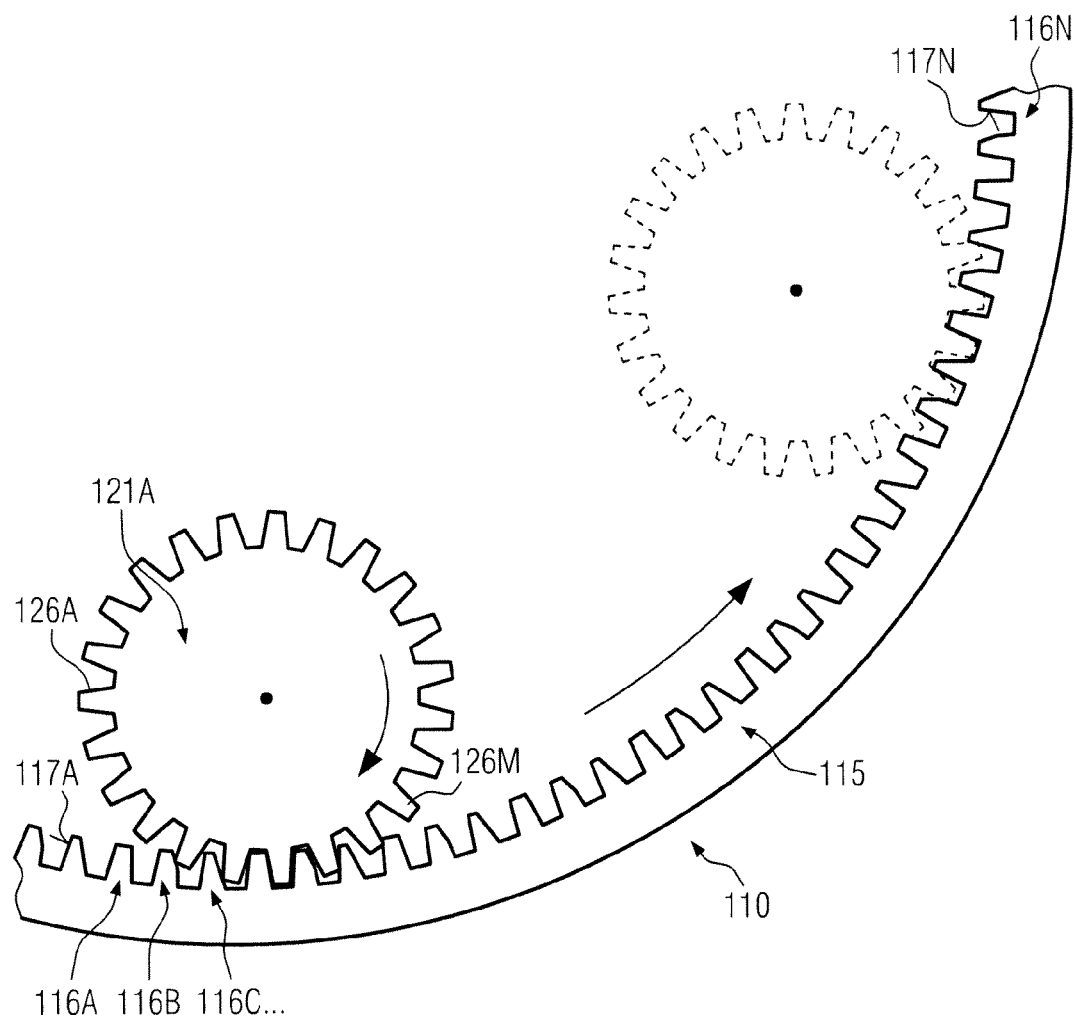
FIG. 1b schematically depicts a portion of the stationary ring gear with teeth having varying flank profiles.

FIG. 1b schematically illustrates a portion of the gearbox 100 in greater detail. As illustrated, a portion of the stationary gear ring 110 is shown so as to have a plurality of teeth 116a, . . . , 116n positioned along the tooth trace 115, as is also discussed above. At least some of the teeth 116a, . . . , 116n have a different flank profile and thus a different geometry or configuration or shape. For example, the tooth 116a has a first flank profile 117a which, as discussed above, may also vary along a width direction, ie. along a direction perpendicular to the drawing plane of FIG. 1b. On the other hand, a second tooth 116n has a corresponding shape or flank profile 117n, which differs from the profile 117a. Similarly, at least some of the teeth 116b, 116c, . . . may differ in their associated flank profile, depending on the position of the corresponding tooth along the tooth trace 115. For example, as shown in FIG. 1b, some of the teeth 116a, . . . , 116n such as the teeth 116b, 116c, . . . are in mesh or engagement with some of the teeth 126a, . . . , 126m of the planetary wheel 121a. Hence, the profiles of the teeth 116b, 116c are correlated with the corresponding circumferential position of these teeth and may thus result in a superior load distribution for a given external load applied to the gear 110 via the planetary wheel 121a, as discussed above. For example, the respective flank profiles are selected such that generally the stress conditions for the teeth 116b, 116c is similar compared to, for instance, the tooth 116n, when the planetary wheel 121a moves along the tooth trace 115, however under the same external torque or load conditions. For example, in the position indicated by the dashed line of the wheel 121a for a constant flank profile of the teeth 116a, . . . , 116n a significantly different load distribution would be obtained, as discussed above, which however according to the appropriately adapted flank profile may thus be more evenly distributed so that after several rotations of the wheel 121a, and any further planetary wheels not shown in FIG. 1b, each of the teeth 116a, . . . , 116n of the stationary ring gear 110 has experienced a very similar mechanical stress.

Furthermore, as explained above, any intermediate teeth between the teeth 116a, . . . , 116n may have an appropriately adapted flank profile so as to comply with the varying load conditions along the length of the tooth trace 115 for the one or more specified load conditions applied via the one or more planetary wheels 121a.

In some illustrative embodiments an appropriate tooth trace correction may also be applied to the teeth 126a, . . . , 126m which may be appropriate for at least some of the individual flank profiles of the teeth 116a, . . . , 116n so as to obtain a desired load distribution. That is to say, due to the reduced diameter and number of the teeth 126a, . . . , 126m compared to the ring gear 110, the teeth of the wheel 121a may have to engage with different types of flank profiles. Thus, the corresponding tooth trace correction may represent an appropriate "compromise" so as to obtain the desired degree of load distribution, which is substantially determined by the adapted flank profile of the teeth 116a, . . . , 116n of the gear 110. In other words, the tooth trace correction for the wheel 121a may depend on the varying flank profiles of the teeth of the ring gear 110. In other illustrative embodiments, depending on the configuration of the gearbox 100, the tooth trace correction on the planetary wheel 121a may be provided within sections. A section length may correspond to a circumferential length of the planetary wheel 121a so that the well defined subset set of the teeth 121a, . . . , 126m within that section may engage with a well defined subset of the teeth corresponding to the section of the tooth trace 115 under consideration. If the corresponding tooth trace correction along the tooth trace 115 is repeated in a "section-wise" manner, then also a varying tooth trace correction may be applied to the planetary wheel 121a, since in each section of the trace 115 only certain teeth will engage with each other in a predictable manner, thereby enabling a superior adaptation and load distribution.

Figure 1C:
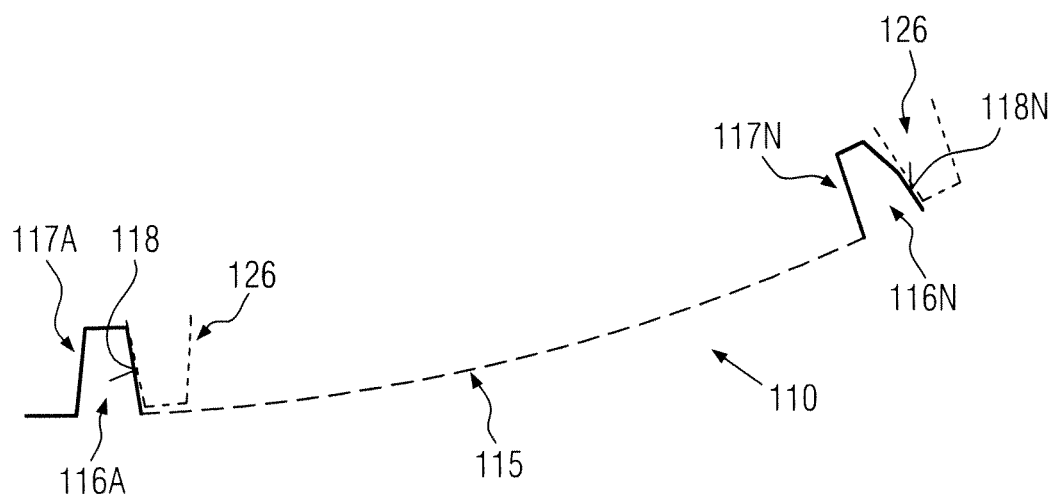
FIG. 1c schematically illustrates a sectional view of the ring gear with different flank profiles at different circumferential positions.

FIG. 1c schematically illustrates a portion of the gearbox 100. As illustrated, a portion of the gearing 110 is illustrated on the basis of a tooth 116a having its associated flank profile 117a, which differs from the flank profile 117n of a further tooth 116n. In the example shown, the difference in the flank profiles 117a, 117n may be obtained by varying the size of a contact surface 118a, 118n of the teeth 116a, 116n, respectively. When, for instance, for a superior spatial balancing of the load conditions, i.e., of the compressive force component acting on the various teeth flank 116a, 116n requires a local reduction of the resulting mechanical pressure in the tooth 116a, the corresponding tooth trace correction may thus result in an enhanced overall contact surface when engaging with a tooth 126, as indicated by the surface 118a. On the other hand, the reduced size of the contact surface 118n may thus be appropriate for inducing substantially the same overall mechanical stress in the tooth 116n for given external torque conditions, as discussed above, thereby generally enhancing overall robustness and reliability of the ring gear 110. It should be appreciated that the adaptation of the corresponding contact surface areas 118a, 118n is only one of several measures in order to provide the individually adapted flank profiles or shapes 117a, 117n. For example, the opposite flanks may also receive corresponding differently shaped profiles and/or the profiling along the tooth width, i.e. along the direction perpendicular to the drawing plane of FIG. 1c, may be individually adapted for the teeth 116a, 116n, respectively. It should be appreciated that applying a tooth flank adaptation individually for each of the teeth 116a, . . . , 116n may, in some illustrative embodiments, involve the modification of different components of each individual tooth. For instance, in one or more of the teeth only one tooth flank may be appropriately profiled, while in other teeth both tooth flanks may be subjected to a dedicated flank profiling process.

It should be appreciated that a progression of forces or load conditions along the tooth trace 115 of the stationary gear component 110 may be obtained by means of calculation, experiments and the like, in which sophisticated simulation programmes may be used for determining the mechanical stress conditions at the various angle of positions along the tooth trace 115, or wherein alternatively or in addition to simulation calculations, experimental data may be gathered in order to obtain a correlation between a specified external load condition, for instance caused by a tilt of a wind rotor, and the angular position along the tooth trace 115 of the ring gear 110.

The tilt angle may be defined as the angle between the axis of the planetary wheel stage 120 and the axis of the said stationary gear component 110, or as the angle between one of the axes of said rotary gear 121a, 121b, 121c when intersecting the axis of the said stationary gear component 110. When contemplating the axes of the rotary gears 121a, 121b, 121c instead of the axis of the planetary wheel stage 120, the tilt angle is the same, as the axes of the rotary gears 121a, 121b, 121c and the axis of the planetary wheel stage 120 are parallel to each other. However, the axes of the rotary gears 121a, 121b, 121c may only intersect the axis of the stationary gear 110 twice during the revolution of around the axis of the stationary gear 110, namely when running through the 90°-position (12h-position) and the 270°-position (18h-position). For a better comprehension of the tilt of the axis of the planetary wheel stage 120 with regard to the axis of the stationary gear ring 110, and the effects by virtue of the tilt on the engagement between the planetary wheels 121a, 121b, 121c and the stationary gear ring 110, a comparative example will now be described with particular reference to FIGS. 2-5.

Figure 2:
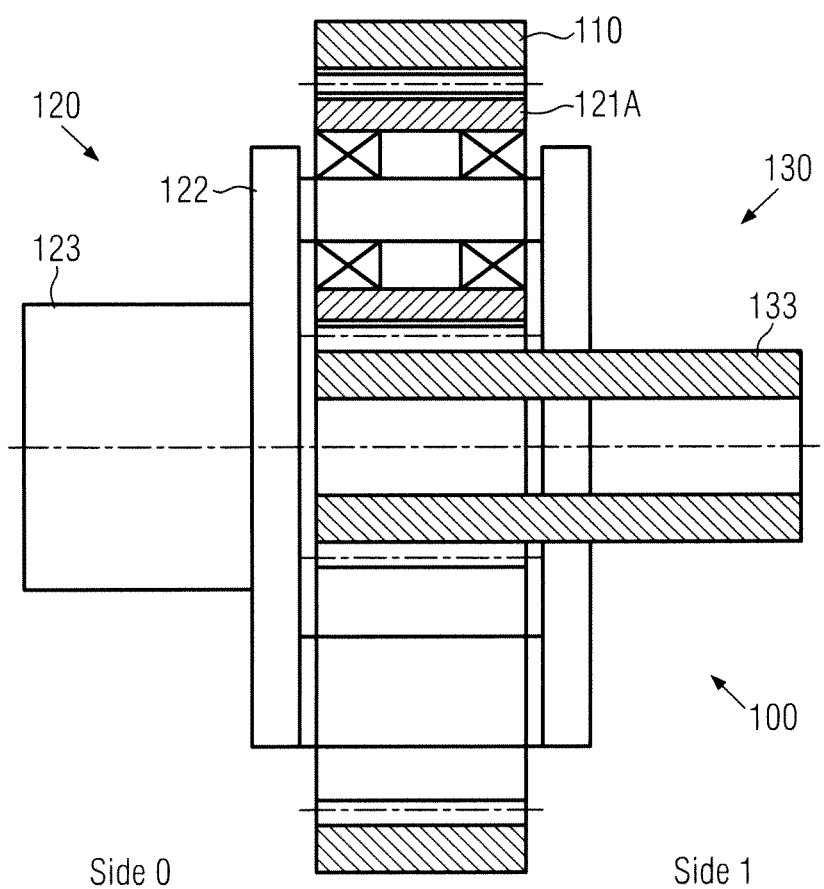
FIG. 2 is an axial sectional view of a gearbox of a comparative example, wherein the axis of the planetary wheel stage is parallel to the axis of the stationary gear ring.

FIG. 2 is an axial sectional view of a gearbox 100 according to a comparative example, wherein the axis of the planetary wheel stage 120 and the axes of the planetary wheels 121a, 121b, 121c, respectively, are parallel to the axis of the stationary gear ring 110. In this case, the axis of the planetary wheel stage 120 is not tilted with regard to the axis of the stationary gear ring 110. The planetary wheels 121a, 121b, 121c are supported by a planetary wheel carrier 122, which is in turn mechanically coupled to the shaft 123 that may support a wind rotor. A torque force of the wind rotor may be applied to the shaft 123 from the side 0, which designates the load input side of the gearbox 100. The shaft 133 of the sun gear 130 may mechanically connect to an electric machine such as a generator and the like on side 1, which designates the load output side of the gearbox 100.

Figure 3:
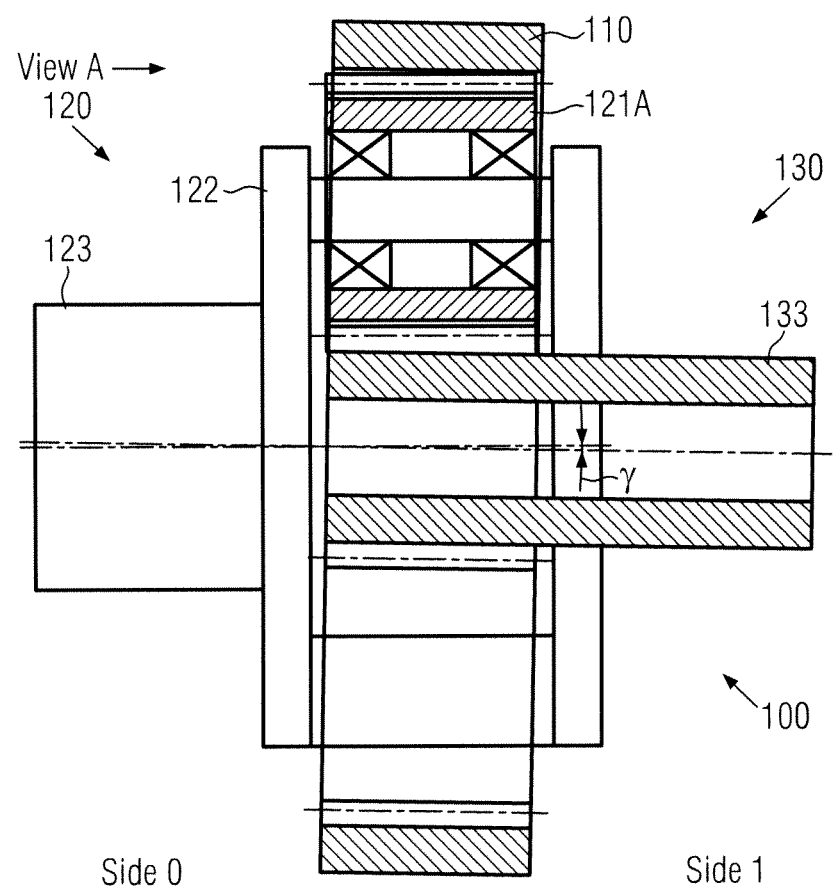
FIG. 3 is an axial sectional view of a gearbox of the comparative example, wherein the axis of the planetary wheel stage is tilted with regard to the axis of the stationary gear ring.

FIG. 3 is an axial sectional view of a gearbox 100 according to the comparative example of FIG. 2, wherein the axis of the planetary wheel stage 120 and the axes of the planetary wheels 121a, 121b, 121c, respectively, are tilted with regard to the axis of the stationary gear ring 110 by a tilt angle γ. The tilt may be due to bending moments and/or torque forces applied to the shaft 123. In this case, a plane spanned by the axis of the planetary wheel stage 120 and the axis of the stationary gear ring 110 may include a vector of the gravity force and extend in vertical direction. The effects by virtue of the tilt on the gear engagement between one of the planetary wheels 121a and the stationary gear ring 110 along the tooth trace 115 under such conditions will be explained in the following with reference to FIGS. 4 and 5a-d.

Figure 4:
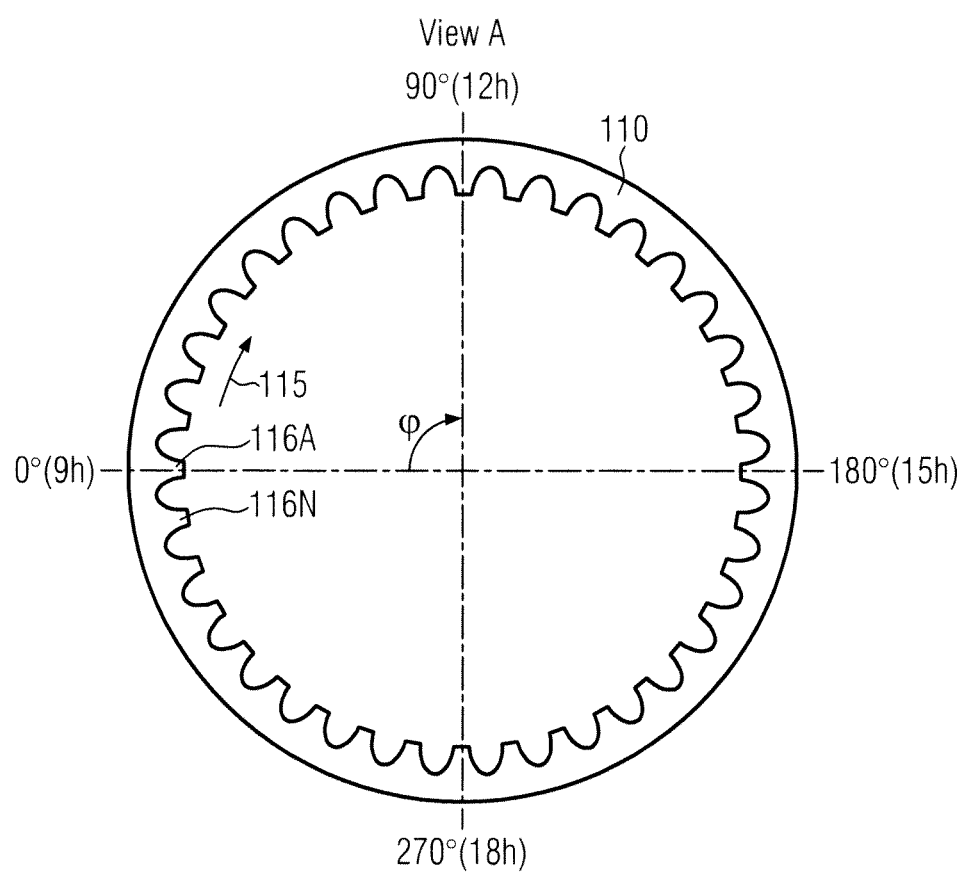
FIG. 4 is a view A of the stationary gear ring of the gearbox depicted in FIG. 3 from the load input side, indicating the 0°-position (9h-position), the 90°-position (12h-position), the 180°-position (15h-position) and the 270°-position (18h-position), respectively, of the engagement between the planetary wheel and the stationary gear ring.

As seen in FIG. 4, which is a view A of the stationary gear ring 110 of the gearbox 100 depicted in FIG. 3 from the load input side 0, the stationary gear ring 110 is installed in the gearbox 100, wherein a plane spanned by the tilted axis of the planetary wheel stage 120 and the axis of the stationary gear component 110 defines a 90°-position (12h-position) and a 270°-position (18h-position). When the tilt results from the gravity force e.g. by virtue of the weight of a wind rotor, the plane spanned by the axis of the planetary wheel stage 120 and said stationary gear component 110 may include a vector of the gravity force. In a different case, which is not shown, when the tilt results from other external forces such as wind loads or the like, the plane spanned by axis of the planetary wheel stage 120 and said stationary gear component 110 may not comprise the vector of the gravity force. In any case, the 0°-position (9h-position) is offset by 90° in clockwise direction from the plane spanned by the axis of the planetary wheel stage 120 and the axis of the stationary gear component 110 as seen from the load input side 0 of the gearbox 100 and measured from the load-side intersecting position of the stationary gear component 110 and said plane. As the plane spanned by the axis of the planetary wheel stage 120 and the stationary gear 110 intersects and defines two positions on the stationary gear component 110, the load-side intersecting position is the one that is closer to the load. In the 0° position, the angle φ is set to be 0°. Hence, the angle φ is measured in clockwise direction starting from this 0° position as seen from the load input side, as defined in FIG. 4.

Figure 5A:
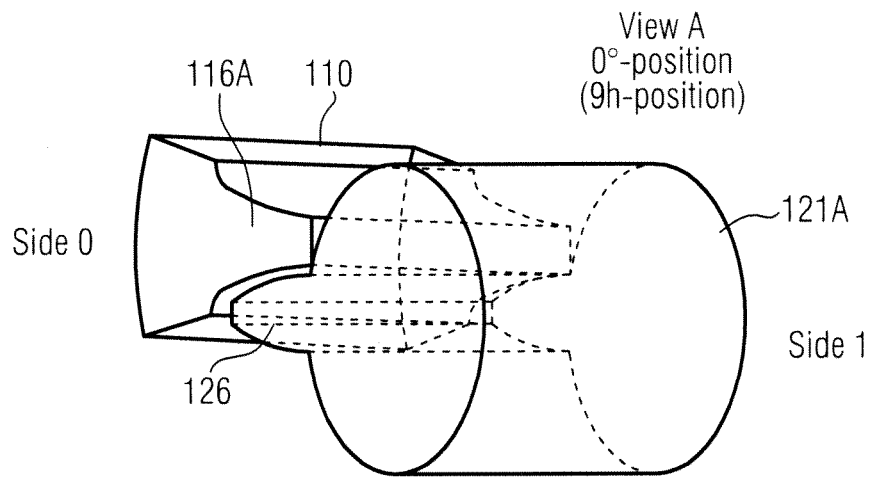
FIGS. 5a-d are partial perspectives views A of the gearbox depicted in FIG. 3, which schematically illustrate the impact of the tilt of the axis of the planetary wheel stage with regard to the axis of the stationary gear ring in a 0°-position (9h-position), a 90°-position (12h-position), a 180°-position (15h-position) and a 270°-position (18h-position), respectively, of the engagement between one of the planetary wheels and the stationary gear ring.
Figure 5B:
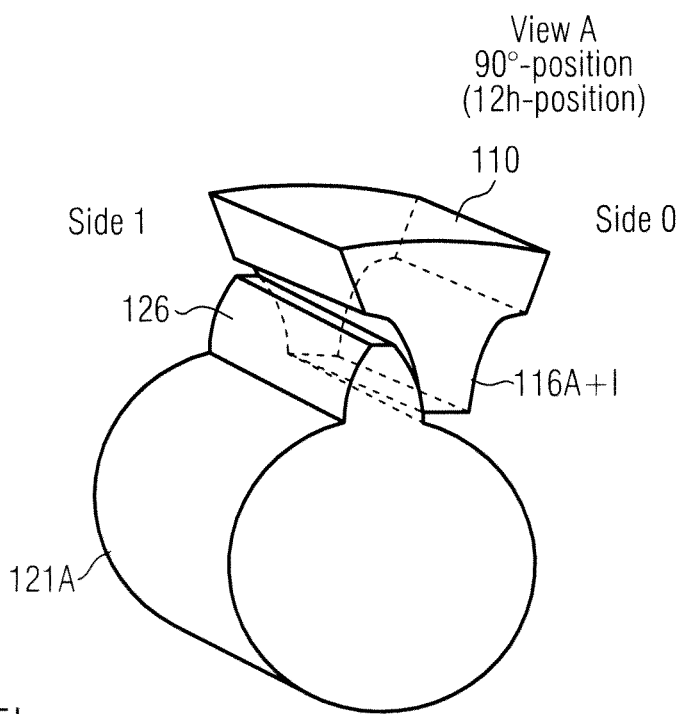
Figure 5C:
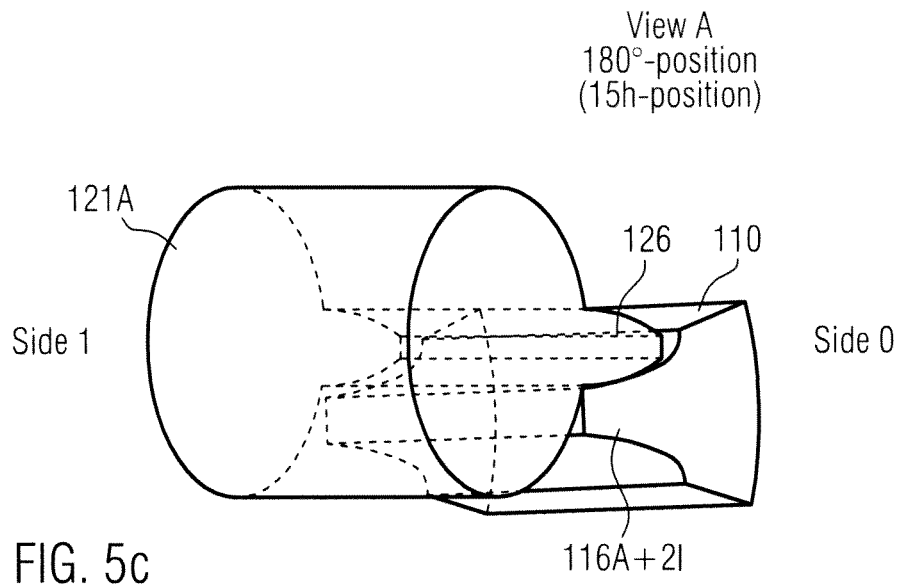
Figure 5D:
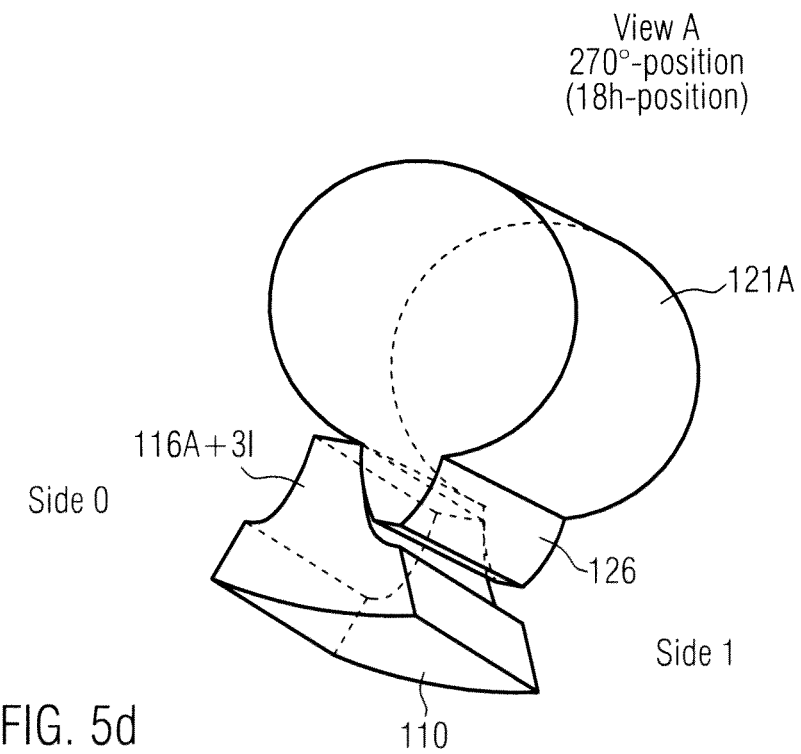

FIGS. 5a-d are partial perspective views A of the gearbox 100 depicted in FIG. 3, which schematically illustrate the effects of the tilt of the axis of one of the planetary wheels 121a with regard to the axis of the stationary gear ring 110 in various positions of the engagement between the planetary wheel 121a and the stationary gear ring 110 along the tooth trace 115. For ease of description, only one tooth 126 of the planetary wheel 121a and only one tooth of the stationary gear ring 110 are shown in the state of engagement. In greater detail, FIG. 5a shows the planetary wheel 121a engaged with the stationary gear ring 110 in the 0°-position (9h-position), FIG. 5b shows the planetary wheel 121a engaged with the stationary gear ring 110 in the 90°-position (12h-position), FIG. 5c shows the planetary wheel 121a engaged with the stationary gear ring 110 in the 180°-position (15h-position) and FIG. 5d shows the planetary wheel 121a engaged with the stationary gear ring 110 in the 270°-position (18h-position).

As seen in FIG. 5a, representing the 0°-position (9h-position), the effective inclination of the axis of the planetary wheel 121a with regard to the axis of the stationary gear ring 110 in a generally radial plane by virtue of the influence of the tilt angle γ is zero, wherein the effective skew of the axis of the planetary wheel 121a with regard to the axis of the stationary gear ring 110 in a generally radial plane by virtue of the influence of the tilt angle γ is at its maximum. Accordingly, the tooth 126 of the planetary wheel 121a and the tooth 116a of the stationary gear ring 110 contact each other only on side 1 and form a gap increasing in the direction of side 0. The side 1 bears the entire load and is subjected to considerable compressive stress.

Further, as seen in FIG. 5b, representing the 90°-position (12h-position), the effective inclination of the axis of the planetary wheel 121a with regard to the axis of the stationary gear ring 110 by virtue of the influence of the tilt angle γ is at its maximum, whereas the effective skew of the axis of the planetary wheel 121a with regard to the axis of the stationary gear ring 110 by virtue of the influence of the tilt angle γ is zero. Accordingly, the tooth 126 of the planetary wheel 121a and the tooth 116a+i of the stationary gear ring 110 may contact each other along an oblique line inclining from side 1 to side 0.

Still further, as seen in FIG. 5c, representing the 180°-position (15h-position), the effective inclination of the axis of the planetary wheel 121a with regard to the axis of the stationary gear ring 110 by virtue of the influence of the tilt angle γ is zero again, whereas the effective skew of the axis of the planetary wheel 121a with regard to the axis of the stationary gear ring 110 by virtue of the influence of the tilt angle γ is back at its maximum. Accordingly, the tooth 126 of the planetary wheel 121a and the tooth 116a+2i of the stationary gear ring 110 contact each other only on side 0 and form a gap increasing in the direction of side 1. Here, the side 0 bears the entire load and is subjected to considerable compressive stress.

Finally, as seen in FIG. 5d, representing the 270°-position (18h-position), the effective inclination of the axis of the planetary wheel 121a with regard to the axis of the stationary gear ring 110 by virtue of the influence of the tilt angle γ is back at its maximum, whereas the effective skew of the axis of the planetary wheel 121a with regard to the axis of the stationary gear ring 110 by virtue of the influence of the tilt angle γ is zero again. Accordingly, the tooth 126 of the planetary wheel 121a and the tooth 116a+3i of the stationary gear ring 110 may contact each other along an oblique line inclining from side 0 to side 1.

It is apparent that the same engagement conditions apply for every one of the planetary wheels 121a, 121b, 121c when it is in one of the above-identified engagement positions along the tooth trace 115.

The invention allows for individual adjustment of the tooth flank profiles of the teeth 116a, . . . , 116n along the tooth trace 115, as the above-identified orientation of the stationary gear ring 110 in the state of installation and the load acting on the shaft 123 that caused the tilt can be determined in advance. Accordingly, an overall tooth flank compensation amount for each one of the teeth 116a . . . 116n along the tooth trace 115 as a function of the e.g. the tilt between the axis of the planetary wheel stage 120 and the axis of the stationary gear component 110, the position angle ϕ of each tooth along the tooth trace 115 and other factors could also be determined in advance. The overall tooth flank compensation amount for the tooth flanks and tooth flank profiles, respectively, of the teeth 116a, . . . , 116n of the stationary gear ring 110 along the tooth trace 115 may be calculated in accordance with the following formula (I):

$$\Delta f\_(\phi) = \sin \phi * f\_\gamma * \sin \alpha\_wt + \cos \phi * f\_\gamma * \cos \alpha\_wt \quad (I)$$

wherein

ϕ=angle of the position of the tooth to be adjusted along the tooth trace 115, wherein the angle is measured in clockwise direction in relation to the center axis of the stationary gear component 110 as seen from the load input side 0 of the gearbox 100, wherein the position representing the position angle ϕ of 0° is a position which is offset by 90° in clockwise direction from a load-side intersecting position of the plane spanned by the axis of the planetary wheel stage 120 and the axis of the stationary gear component 110, and the stationary gear component 110, as seen from the load input side 0 of the gearbox 100, as shown in FIG. 4;

f_γ=amount of the effective flank line angular deviation by virtue of the influence of the tilt γ the axis of the planetary wheel stage 120 and the axis of the stationary gear component 110, wherein f_γ=b*tan (γ) and b corresponds to the width of the tooth along an axial direction of said stationary gear component 110, wherein the amount of the effective flank line angular deviation f_γ may be calculated in accordance with DIN 3964 of November 1980, for example;

α_wt=working pressure angle of the gear engagement between one of the rotary gears 121a, 121b, 121c and the stationary gear component 110, which may be identified, for example, in accordance with formula (21.3/17) of the handbook "Maschinenelemente Band II—Getriebe allgemein, Zahnradgetriebe—Grundlagen, Stirnradgetriebe"; Niemann, Gustav; $2^{nd}$ revised edition 1983, Springer-Verlag; and Δf_(ϕ)=overall tooth flank compensation amount by virtue of the influence of the parameters ϕ, f_γ and α_wt.

The overall tooth flank compensation amount Δf_(ϕ) represents the deviation from a regular flank line that may be calculated for tooth flanks and tooth flank profiles, respectively, as described in section 21.4.5b) of the handbook "Maschinenelemente Band II—Getriebe allgemein, Zahnradgetriebe—Grundlagen, Stirnradgetriebe"; Niemann, Gustav; $2^{nd}$ revised edition 1983, Springer-Verlag, in consideration of DIN 3960 to 3967 as valid in November 1980 and the norms referred to therein.

According to the invention, the tooth flank profiles of the teeth 116a, . . . , 116n of the stationary gear ring 110 along the tooth trace 115 are individually adjusted so as to compensate for the tilt of the axis of the planetary wheel stage 120 with regard to the axis of the stationary gear ring 110 by virtue of the influence of an external load. Therefore, an optimum engagement contact between the planetary wheels 121*a*, 121*b*, 121*c* and the stationary gear ring 110 can be secured at every engagement position along the tooth trace 115. Hence, mechanical loads can be transferred between the planetary wheels 121*a*, 121*b*, 121*c* and the stationary gear ring 110 more evenly, such that local peaks of compressive stress can be reduced and the operational lifetime of the gearbox 100 is significantly increased.

Figure 6:
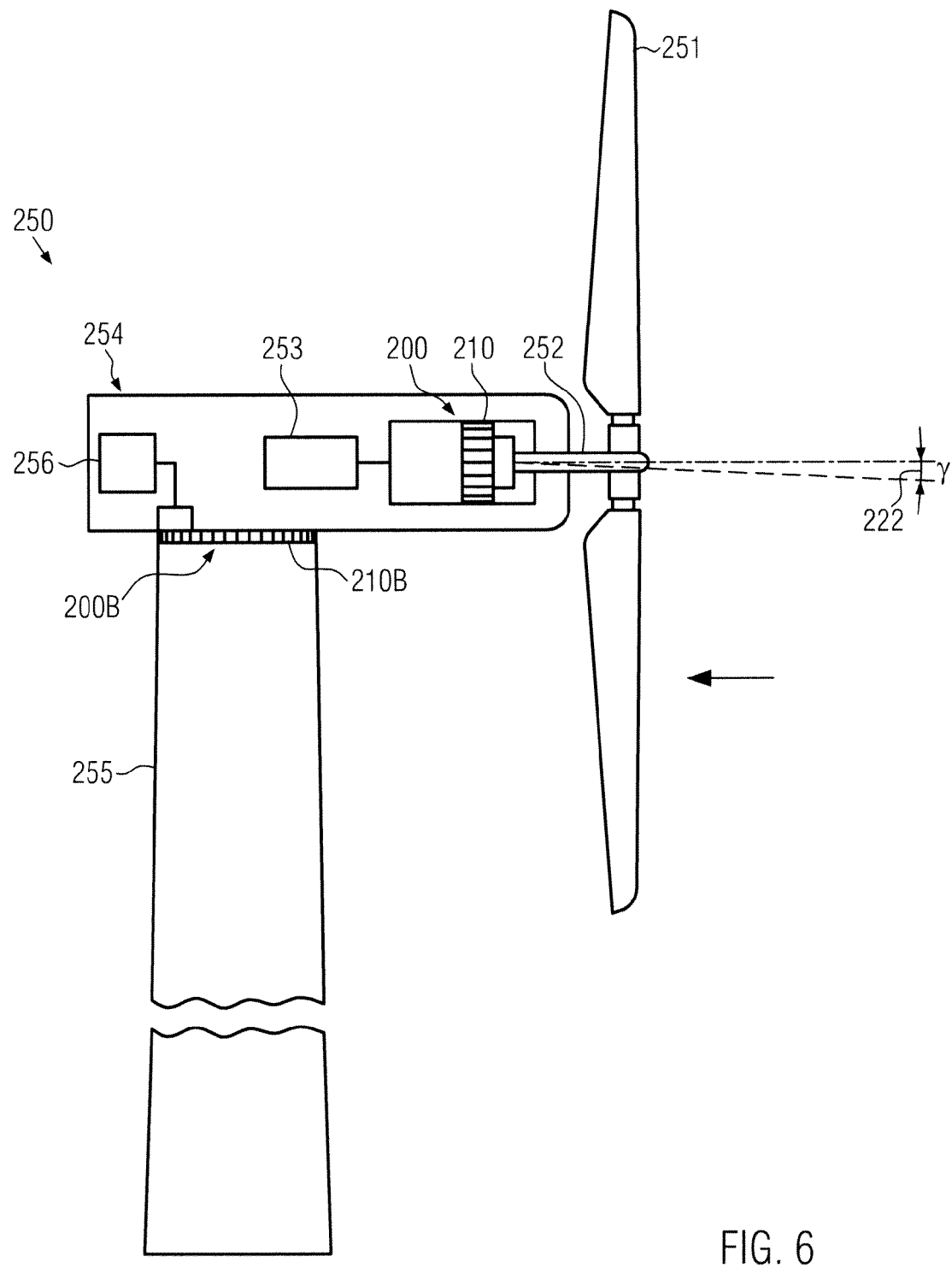
FIG. 6 schematically illustrates a sectional view of a wind power plant including a planetary gearbox with a stationary ring gear having a varying tooth trace correction.

FIG. 6 schematically illustrates a wind power plant 250, which may comprise an electric machine 253 that is mechanically coupled to a wind rotor 251 via a gearbox 200, which may have a configuration as discussed above with reference to the gearbox 100. That is, the gearbox 200 in some illustrative embodiments comprises a stationary ring gear 210 having provided therein an appropriate tooth trace correction that varies along the circumferential direction of the ring gear 210, as described above. Moreover, the gearbox 200 may comprise any further components, such as a planetary wheel stage of which only a carrier 222 is schematically illustrated in FIG. 6. Thus, the wind rotor 251 is mechanically coupled via a shaft 252 to the carrier 222, which in turn transfers mechanical load to the stationary ring gear 210. Consequently, due to the substantially horizontal orientation of the shaft 252*a* certain tilt of the shaft 252 caused by the wind rotor 251 may occur, for instance caused by the weight of the wind rotor 251 in combination with any external wind loads. The electric machine 253 and the gearbox 200 are accommodated in a housing or nacelle 254, which in turn is positioned on a tower 255 wherein the nacelle 254 is rotatably attached to the tower 255 by means of a yaw system, which may comprise a gear system 200*b* and a drive assembly 256, wherein in some illustrative embodiments the gear system 200*b* may comprise at least one "stationary" gear 210*b*, wherein it should be appreciated that the term "stationary" may refer to an arrangement in which the gear 210*b* is fixed relative to the nacelle 254 or the tower 255.

Consequently, by providing the stationary ring gear 210 with the varying tooth trace correction, as discussed above, superior performance and durability of the gearbox 200 may be accomplished since a certain load condition, for instance a certain tilt angle γ of the shaft 252, may be taken into consideration in designing the gearbox 200. Consequently, for at least one load condition caused by external influences, such as the tilt angle γ, an enhanced load distribution may be accomplished within the gearbox 200 thereby enabling the processing of higher mechanical input powers for a given volume and weight of the gearbox 200 compared to conventional devices. Thus, for a given family of wind turbines 250 a greater power specification may be used, or in other cases for a given power specification the overall size and thus weight of the gearbox 200 may be reduced without negatively affecting durability and performance.

In other illustrative embodiments, in addition to or alternatively to providing the gearbox 200 with the ring gear 210 having the position-dependent tooth trace correction, the stationary component 210*b* of the yaw system may be provided with a varying tooth trace correction. For example, the wind turbine 250 may be positioned in an environment in which a preferred wind direction is present. In this case, the load distribution along the tooth trace of the gear 210*b* may also significantly differ when averaged over elongated time intervals, while at the same time any small angle corrections may have to be performed within a specific section of the gear 210*b*. In other cases, the gear 210*b* may be stationary with respect to the nacelle 254 so that upon orienting the nacelle 254 with respect to the wind direction also a substantially imbalanced load distribution may occur along the tooth trace of the gear 210*b*. Although generally the transferred mechanical power may be significantly less compared to the power transferred by the gearbox 200, superior performance and durability for a given size and weight of the gear system 200*b* may be accomplished on the basis of similar concepts by applying a tooth trace correction depending on the angular position within the gear 210*b*.

Figure 7:
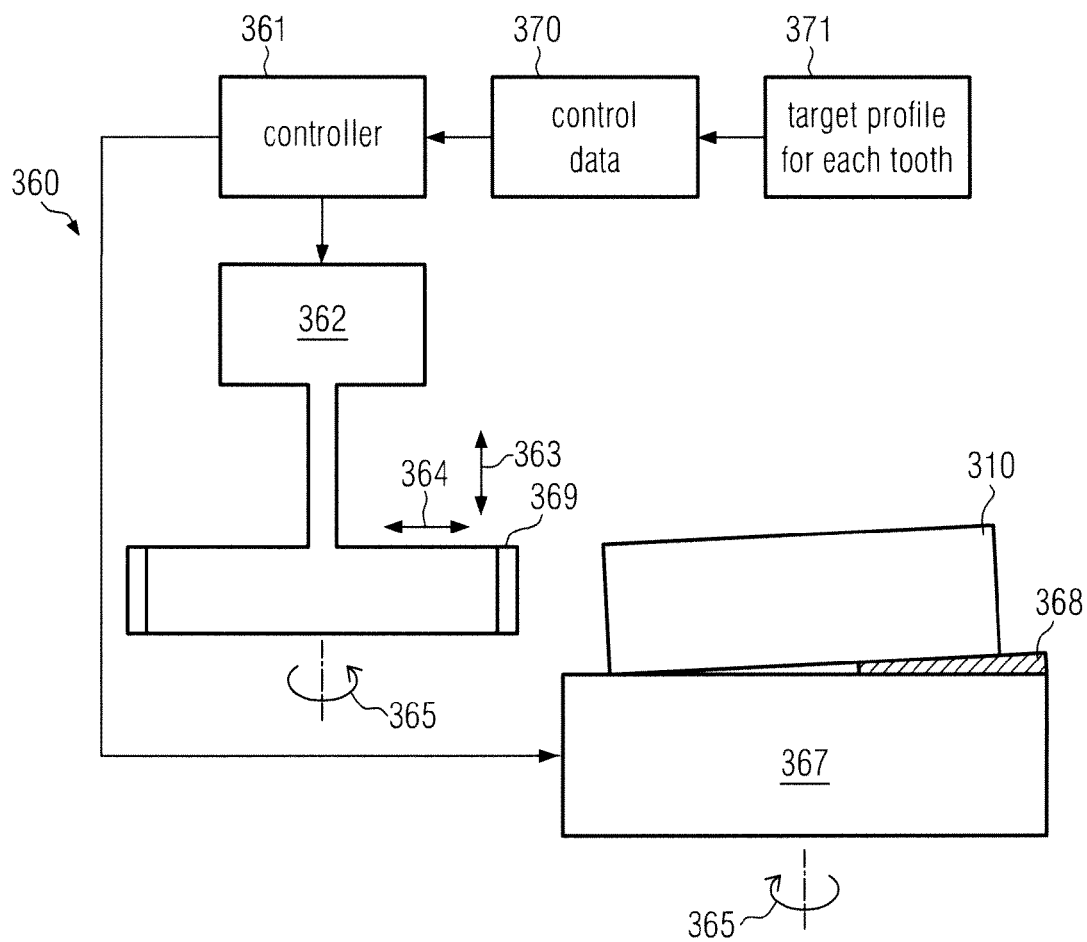
FIG. 7 schematically illustrates a sectional view of a grinding system for performing the circumferentially varying tooth trace correction.

FIG. 7 schematically illustrates a process tool 360 that is appropriate for performing a position-dependent tooth trace correction and/or for fabricating teeth of a gear component 310, wherein the tooth configuration varies along the tooth trace in accordance with a specified target flank profile distribution. In some illustrative embodiments the process tool 360 represents a grinding tool configured for performing a controlled grinding process or material removal process in order to form or modify a certain pattern in the gear component 310. For example, the process tool 360 comprises a drive system 362, which may enable the movement of a grinding tool 369 along several spatial axes, for instance as indicated by a height axis 363, a translational axis 364 and a rotation axis 365. It should be appreciated that the process tool 360 comprises any appropriate component, for instance on the basis of well-established and available conventional grinding tools, which however are not shown in FIG. 7. Moreover, the process tool 360 comprises a work piece holder or stage 367, which is appropriately configured to receive the gear 310 in a substantially non-processed state or a pre-processed state with respect to any teeth to be formed or modified in the gear 310. To this end, the work piece holder 367 may comprise an appropriate drive assembly (not shown) in order to provide a rotational movement along a rotation axis, as indicated by 366. Consequently, by appropriately initiating a relative movement between the grinding tool 369 and the gear 310, the outer circumference of the gear 310 may be formed or patterned in accordance with the basic tooth configuration of the tool 369. To this end, the process tool 360 comprises a control unit 361, which applies appropriate control signals to the drive assembly 362 and the work piece holder 367. Consequently, during operation of the tool 367 in some illustrative embodiments a basic configuration of corresponding teeth may be generated in the gear 310 after which, in conventional strategies, a further manufacturing step is applied so as to modify the flank profiles of the previously generated teeth in accordance with a desired target flank profile. According to the principles disclosed herein, appropriate control data 370 are provided to the control unit 361 so as to enable a specific tooth trace correction for at least some different positions along the tooth trace of the gear 310. To this end, the control data 370 may comprise appropriate data for generating control signals, which in turn may cause the drive assembly 362 so as to modify the basic tooth shape in accordance with a desired target profile 371, which may be obtained on the basis of calculation and experiments, as for instance previously discussed above. In some illustrative embodiments, the control data set 370 is appropriately configured to enable the individual adaptation of each tooth provided in the gear 310. For example, upon controlling and monitoring the rotational movements 365, 366, the translation 364 and the stroke in the height direction 363 may be controlled such that a desired shape for each tooth is obtained so as to comply with the target profile 371.

In other illustrative embodiments, additionally or alternatively to controlling the relative movement between the gear 310 and the grinding tool 369 on the basis of the control data set 370, the positioning of the gear 310 on the work piece holder 367 may be appropriately "modulated", for instance by influencing the position coordinates for the gear 310, at least in one direction. For example, by means of providing an intentionally modified surface of the holder 367, the position coordinates of at least some point of the gear 310 are shifted, for instance substantially in height, as indicated by the positioning element 368, thereby "superimposing" an additional component when moving the gear 310 relatively to the grinding tool 369 upon operating the process tool 360. For example, upon rotating the holder 367, due to the positioning element 368, a certain degree of "wobbling" is moderated on the rotational motion 366 thereby enabling corresponding modification of the resulting tooth trace correction, even if the control unit 361 may provide control signals that may correspond to a conventional spatially constant trace correction. Consequently, by appropriately selecting the size and shape of the position element 368 or by fixing the gear 310 in an appropriate modified manner on the work piece stage 367, a desired profile along the tooth trace of the gear 310 may be accomplished.

In still other illustrative embodiments, the positioning of the gear 310 may be adjusted so as to deviate from the regular position, while at the same time appropriate control data 370 which, per se, may result in a circumferentially varying trace correction may be applied so that the combined effect may thus yield the desired target profile for each of the teeth of the gear 310. In this manner, superior flexibility may be obtained, for instance by "extending" the degree of modulation, which may for instance be restricted by the available range of movement of the drive assembly 362, since by appropriately positioning the gear 310 an additional degree of freedom is obtained in adjusting the finally desired tooth trace correction.

The present invention is not limited to arrangements involving a ring gear as the stationary gear component but likewise applies to arrangements involving a stationary planet carrier or a stationary sun gear or another gear of the gearbox as the stationary gear component, since the formula (I) remains valid for such alternative arrangements.

What is claimed is:

1. A gear box, comprising:
   a stationary gear component having a plurality of teeth formed along a tooth trace, at least some of said plurality of teeth differing in their tooth flank profiles at least at an initial phase of an operational lifetime of said gear box; and
   at least one rotary gear mechanically coupled to a subset of said teeth.

2. The gear box of claim 1, wherein said tooth flank profiles are individually adjusted as a function of at least one of the following parameters:
   a. a parameter ($\phi$) representing a position of the tooth to be adjusted along said tooth trace;
   b. a parameter ($\gamma$) representing a positional and/or directional and/or dimensional relation between said rotary gear and said stationary gear component, preferably a parameter ($\gamma$) representing a tilt between the axes of said rotary gear and said stationary gear component;
   c. a parameter relating to the transmission of energy and/or the gear engagement between said rotary gear and said stationary gear component, preferably a parameter representing a working pressure angle between said rotary gear and said stationary gear component;
   d. a parameter representing a dimension of said rotary gear and/or a dimension of said stationary gear component, preferably a parameter representing a width of the respective tooth face of the stationary gear component.

3. The gear box of claim 1, wherein said tooth flank profiles are individually adjusted as a function of the following formula:

$$\Delta f\_(\phi) = \sin\phi * f\_\gamma * \sin\alpha\_wt + \cos\phi * f\_\gamma * \cos\alpha\_wt \quad (I)$$

wherein $\phi$ = angle of the position of the tooth to be adjusted along said tooth trace, wherein the angle is preferably measured in clockwise direction in relation to the center axis of the stationary gear component as seen from the load input side (side 0) of the gearbox, wherein the position representing an angle $\phi$ of 0° is most preferably a position which is offset by 90° in clockwise direction from a load-side intersecting position of a plane spanned by the axis of said rotary gear and by the axis of said stationary gear component when intersecting, and said stationary gear component, as seen from the load input side (side 0) of the gearbox;

f\_$\gamma$ = amount of the effective flank line angular deviation by virtue of the influence of the tilt ($\gamma$) the axis of said rotary gear when intersecting the axis of said stationary gear component, wherein f\_$\gamma$=b*tan ($\gamma$) and b corresponds to the width of the tooth along an axial direction of said stationary gear component;

$\alpha$\_wt = working pressure angle of the gear engagement between said rotary gear and said stationary gear component; and $\Delta f\_(\phi)$ overall tooth flank compensation amount by virtue of the influence of the parameters $\phi$, f\_$\gamma$ and $\alpha$\_wt.

4. The gear box of claim 1, which is configured to meet at least one of the following requirements:
   a. Said stationary component is a ring gear of a planetary gear stage;
   b. Said at least one rotary gear is one of a plurality of planet wheels of said planetary gear stage engaged with said ring gear;
   c. Said at least one rotary gear is connected to a mechanical load so as to cause compressive forces to act on said teeth flank of said stationary gear component that vary along said tooth trace during movement of said at least one rotary gear;
   d. A difference in tooth flank profiles of said at least some of said plurality of teeth is correlated to said variation of said compressive forces;
   e. Said at least one rotary gear is configured to be coupled to a rotor of a wind power plant;
   f. The gear box further comprising at least one further rotary gear engaged with said at least one rotary gear and mechanically coupled to a generator of said wind power plant;
   g. Said stationary gear component is a part of a drive train for rotating a nacelle of a wind power plant;
   h. Said gear box is configured to transfer a mechanical power of 100 kW or higher.

5. A method of fabricating a stationary gear component of a gear box that is to be engaged with at least one rotary gear of the gear box, comprising:
   adjusting a flank profile of teeth of the stationary gear component so as to differ for at least some of the teeth along a tooth trace of the stationary gear component.

6. The method of claim 5, wherein adjusting a flank profile of teeth of the gear component comprises determining a force distribution along the tooth trace for a given flank profile for each of the teeth and adapting the flank profile of the at least some of the teeth in correlation to the determined force distribution.

7. The method of claim 6, wherein determining the force distribution comprises determining torque forces acting on the stationary gear component via the at least one rotary gear when coupled to a substantially horizontal shaft of a wind rotor.

8. The method of claim 5, wherein adjusting a flank profile of the teeth comprises establishing a relative motion between the stationary gear component and a material removal tool and performing a material removal process so as to form the at least some teeth that differ in their flank profiles.

9. The method of claim 8, wherein adjusting a flank profile of the teeth further comprises establishing a control data set on the basis of a target flank profile of each of the teeth and controlling the relative motion by using the control data set.

10. The method of claim 8, wherein adjusting a flank profile of the teeth further comprises positioning the stationary gear component on a support of a material removal tool so as to obtain different position coordinates of the stationary gear component along at least one spatial direction for at least two different locations along the tooth trace.

* * * * *

UNITED STATES PATENT AND TRADEMARK OFFICE
CERTIFICATE OF CORRECTION

| | | |
|---|---|---|
| PATENT NO. | : 8,613,688 B2 | Page 1 of 1 |
| APPLICATION NO. | : 13/563386 | |
| DATED | : December 24, 2013 | |
| INVENTOR(S) | : Andreas Enting | |

It is certified that error appears in the above-identified patent and that said Letters Patent is hereby corrected as shown below:

In The Claims

CLAIM 3, Column 18, line 27 reads "...$\Delta f\_(\varphi)$ overall tooth flank..." and should read --...$\Delta f\_(\varphi)$ = overall tooth flank...--.

Signed and Sealed this
Thirtieth Day of December, 2014

Michelle K. Lee
*Deputy Director of the United States Patent and Trademark Office*